Sept. 28, 1965  A. D. RIEDLER ETAL  3,208,693
LIFT AUGMENTING DEVICE
Filed Nov. 19, 1963  4 Sheets-Sheet 1
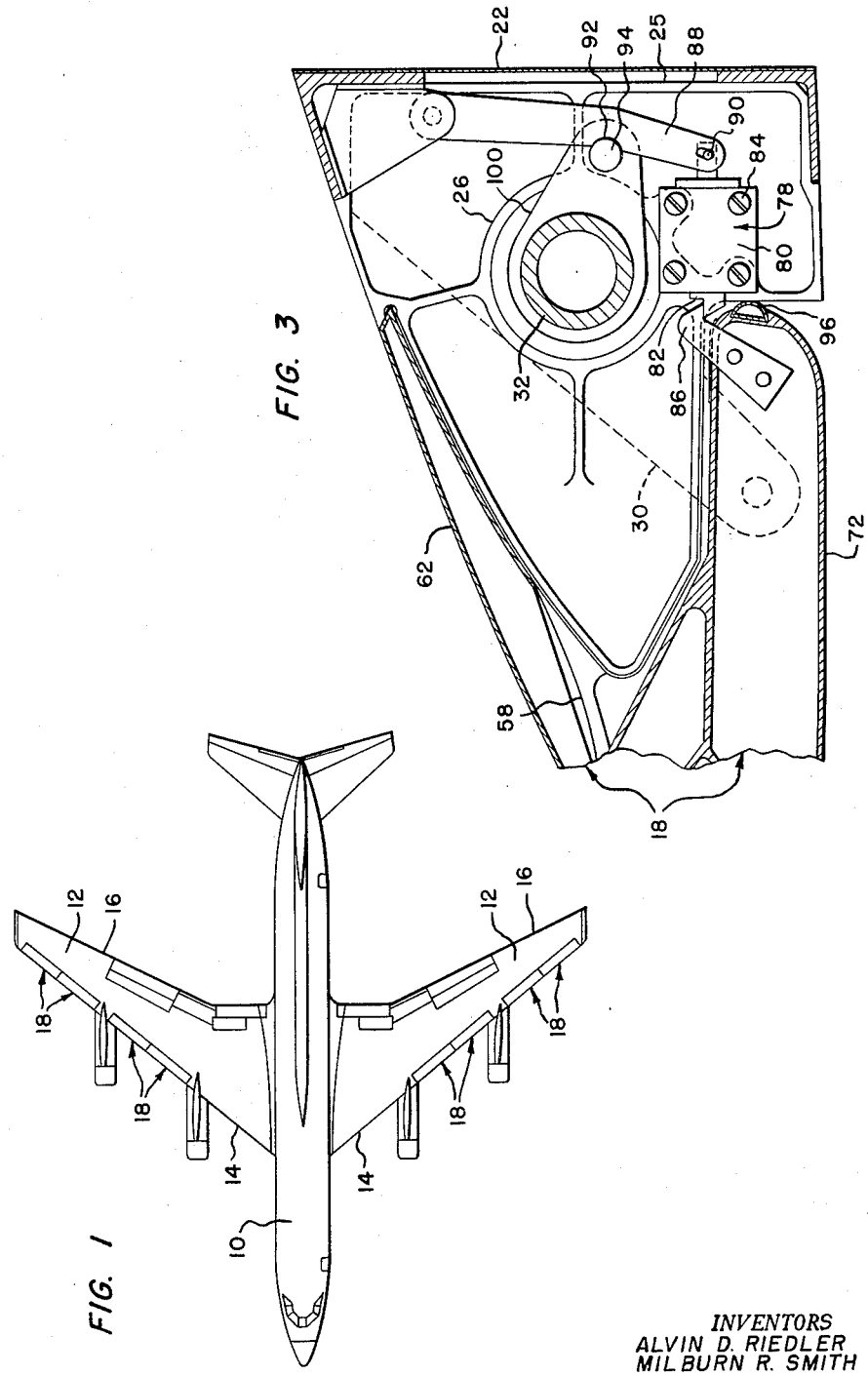
INVENTORS
ALVIN D. RIEDLER
MILBURN R. SMITH
BY
*Carl R. Brown*
ATTORNEY

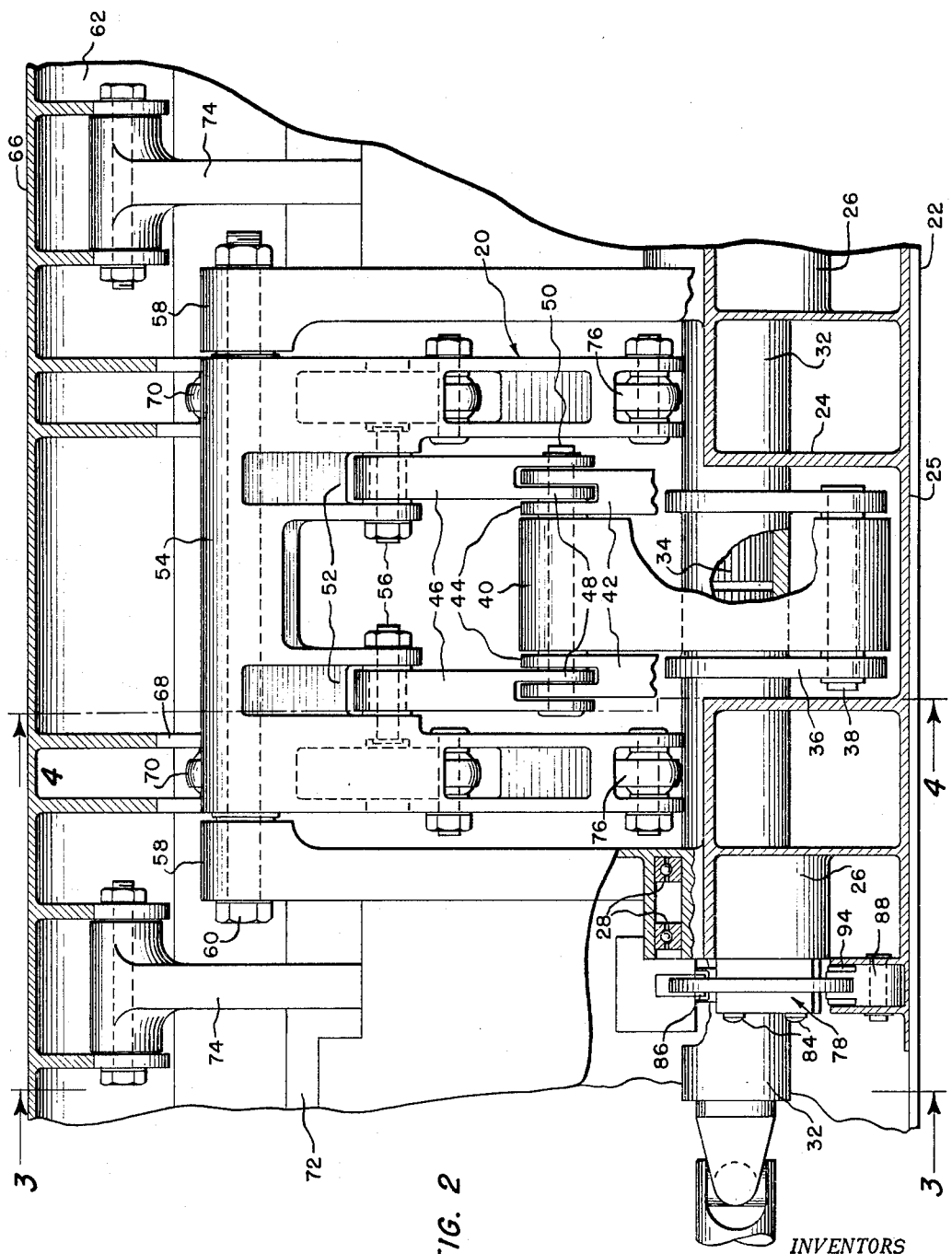

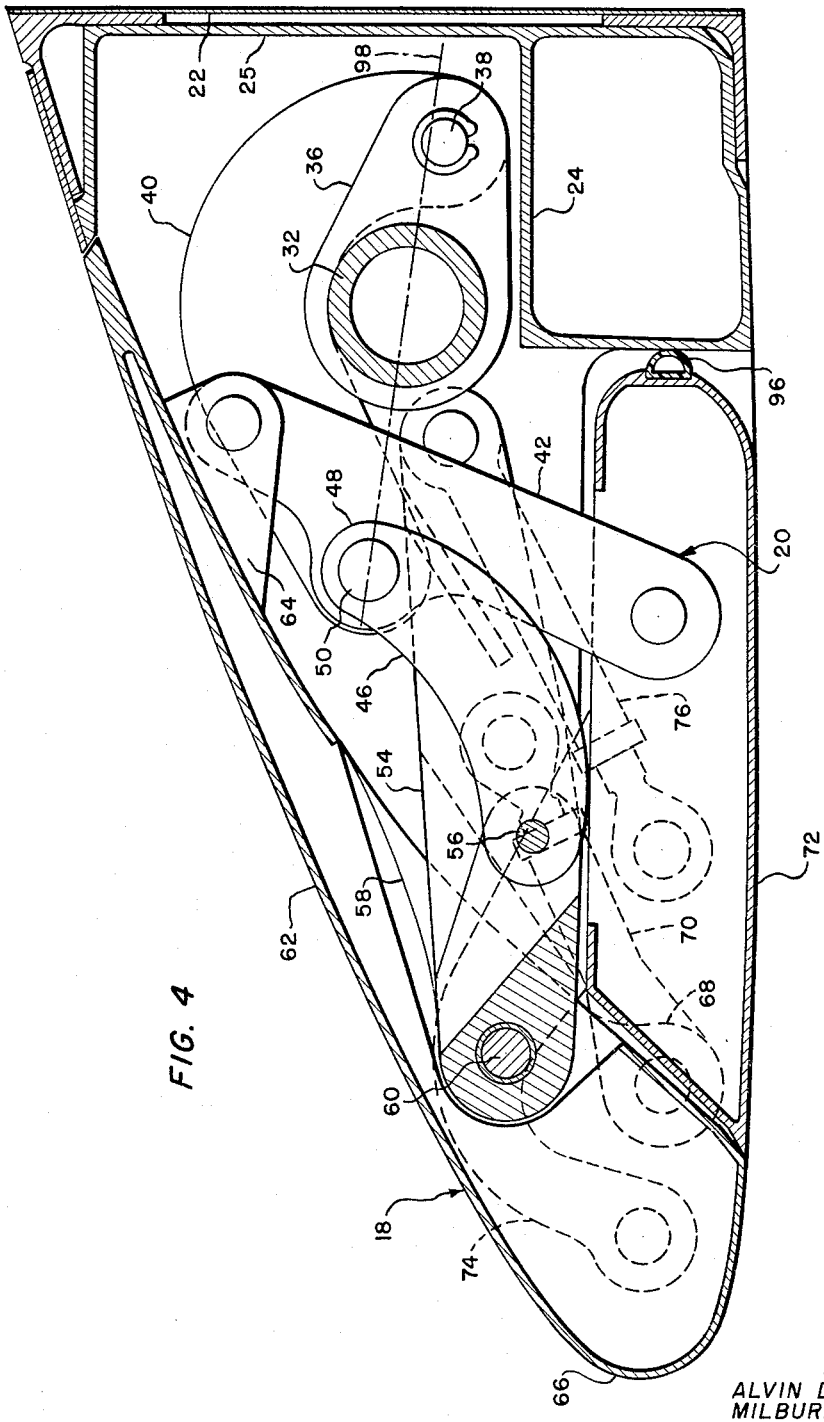

Sept. 28, 1965   A. D. RIEDLER ETAL   3,208,693
LIFT AUGMENTING DEVICE
Filed Nov. 19, 1963   4 Sheets-Sheet 4

INVENTORS
ALVIN D. RIEDLER
MILBURN R. SMITH
BY
ATTORNEY

United States Patent Office 3,208,693
Patented Sept. 28, 1965

3,208,693
LIFT AUGMENTING DEVICE
Alvin D. Riedler, Redlands, and Milburn R. Smith, La Mesa, Calif., assignors to General Dynamics Corporation, San Diego, Calif., a corporation of Delaware
Filed Nov. 19, 1963, Ser. No. 324,796
1 Claim. (Cl. 244—42)

The present invention relates generally to a lift augmenting device and more particularly to a combination slat and flap supported on the leading edge of an airfoil adapted to increase the lift thereof upon being extended.

The public demand for faster air transportation has resulted in a significant increase in the number of jet aircraft being placed into service as replacements for the slower-flying, propeller-driven aircraft. Jet aircraft, due to their higher take-off speeds, require substantially longer ground runs before the aircraft can gain sufficient speed to be airborne. Consequently many airport runways that were originally designed to accommodate propeller driven aircraft, are unsuitable for jet aircraft use due to their inadequate runway length. In cities where the surrounding area permits, runway lengths may be increased to accommodate jet operation. However, many airports located in various cities around the world are so situated as to make runway extension virtually impossible. For example, airports that are situated on a high plateau, or surrounded by hills and mountains, or located adjacent a body of water, or located in a highly congested business or residential area, most likely cannot be modified or extended to serve jet aircraft. Consequently these airports are necessarily limited to use by propeller-driven aircraft. For the convenience of the public, it is desirable to locate the airports as close to the central business district as possible. Construction of an airport suitable for jet operation may require the selection of a building site removed from the city or its central business district. Obviously the time saved by converting to the faster jet aircraft may be partially, if not entirely, offset by the additional time required to travel from an isolated or outlying airport to the desired destination.

The present invention is directed towards increasing the lift of airfoils in order to permit take-off and landing of aircraft from runways previously believed to be limited to use by propeller driven aircraft. The increased lift is achieved through a unique slat-flap combination pivotally linked to the leading edge of the airfoil or aircraft wing.

Within the internal structure of the leading edge portion of an aircraft wing, there is fixedly mounted an actuator motor having a rotatable shaft to which a radially extending lever element is secured. A substantially C-shaped crank is pivotally connected at one end thereof to the lever element. The opposite end of this crank is pivotally secured to a pair of spaced-apart fulcrum arms at a position intermediate the ends thereof. One end of the fulcrum arms is pivotally secured to the wing spar through a frame fixedly mounted thereon. The opposite end of the fulcrum arms is pivotally journalled to a fitting fixed to a slat adjacent the aft end thereof. One end of a pair of transfer links is pivotally secured to each of the fulcrum arms on the same axis as the connection of the C-shaped crank. The opposite end of the tranfer links is pivotally secured to a fulcrum crank intermediate the ends thereof. One end of the fulcrum crank is pivotally connected to the frame carried by the wing spar. The fulcrum crank pivotally carries a pair of spaced-apart slat links and flap links. One end of the slat links is pivotally mounted onto the fulcrum crank at a position intermediate the ends thereof. The flap links are pivotally secured at one end thereof to the fulcrum crank at the end opposite its connection to the spar frame. The slat end flap links are pivotally secured at their opposite ends to a slat and flap respectively. The flap is hingedly secured to the forward end of the slat through pairs of hinge horns fixed to the flap.

In retracted position, the lift augmenting slat-flap device is locked in position by an up-latch mechanism. This up-latch mechanism comprises a spring biased latch slidable in a housing secured to the frame carried by the wing spar. The latch engages a hook secured to the flap to prevent accidental extension thereof. An up-latch lever disengages the latch from the flap hook upon initial rotary motion of the actuator shaft. Subsequent rotation of the actuator motor results in the extension of the lift augmenting device to a position forwardly of the wing leading edge. Reversal of the actuator motor retracts the lift augmenting device into a nesting position within the contour of the leading edge of the wing. In this position, the up-latch engages the flap hook to lock the lift augmenting device in fully retracted position. In addition to the up-latch, the linkage mechanism also serves to lock the lift augmenting device in retracted position by an over-center arrangement of the linkage.

An object of this invention is to provide a lift augmenting device for use on an airfoil that will substantially increase the lift afforded thereby.

Another object is to provide a lift augmenting device embodying a construction wherein a leading edge flap is combined with a leading edge slat to augment the lift of an airfoil.

A further object is to provide a lift augmenting device that will permit ground or water take-off of aircraft at substantially reduced speeds.

Another object is to provide a lift augmenting device for use on the leading edge of an aircraft sustaining surface which embodies a linkage mechanism employing an over-center arrangement to effect locking in retracted position.

Still another object is to provide a lift augmenting device in which the linkage mechanism thereof is pin jointed together in order to reduce friction and preclude objectionable chatter and flutter conditions.

Yet another object is to provide a lift augmenting device for use on the leading edge of an aircraft sustaining surface embodying a linkage mechanism in which the actuating motor thereof is relieved of all load and remains completely inoperative when the lift augmenting device is in fully extended or fully retracted positions.

Other objects and features of the present invention will be readily apparent to those skilled in the art from the following specification and appended drawings wherein is illustrated a preferred form of the invention, and in which:

FIGURE 1 is a plan view of an airplane embodying the lift augmenting device of the present invention.

FIGURE 2 is an enlarged fragmentary plan view of the leading edge of the wing shown in FIGURE 1 with portions broken away and in section to facilitate the illustration.

FIGURE 3 is a cross sectional view taken on the line 3—3 of FIGURE 2,

FIGURE 4 is an enlarged cross sectional view taken on the line 4—4 of FIGURE 2.

Figure 5:
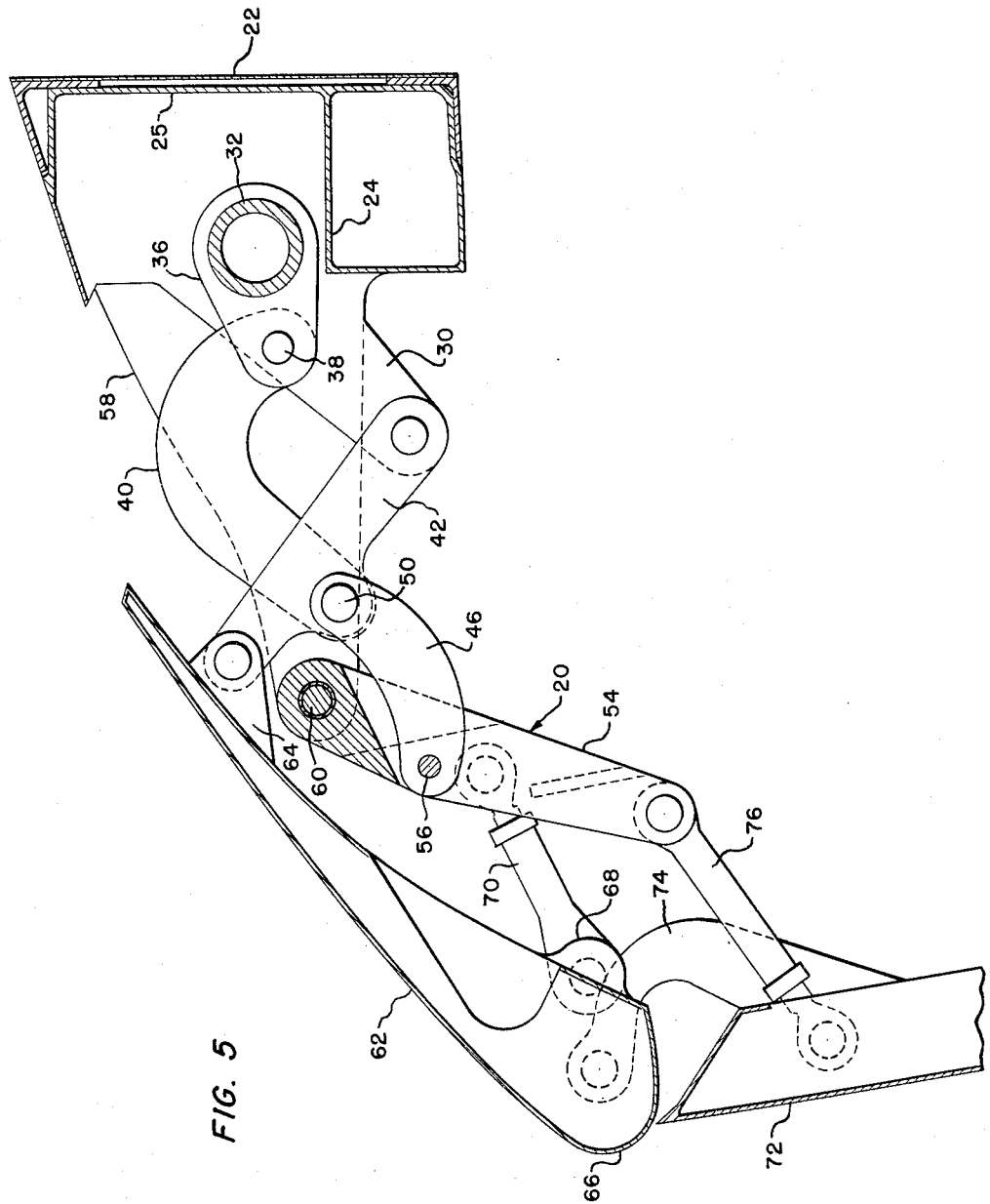
FIGURE 5 is a cross sectional view taken in the same plane as FIGURE 4 showing the lift augmenting device of the present invention in extended position on a reduced scale.

Referring now to the drawing, there is shown in FIGURE 1 an airplane having a fuselage 10 from either side of which laterally extend wings 12—12 of sweptback configuration, the leading and trailing edges of which are respectively designated 14 and 16. Lift augmenting devices 18 shown in retracted position, extend spanwise of the wings 12—12. Although four such lift augmenting devices are indicated for each wing, this is not to be construed as a limitation. Obviously the number and the spanwise extent of the lift augmenting device is subject to variation with the particular application. As will be described in greater detail hereinafter, the lift augmenting devices when extended, assume positions forward of and generally parallel to the wing leading edges to define therewith spanwise spaces or slots.

The lift augmenting devices 18 of the present invention are contoured to conform with the leading edge of the aircraft wings when in retracted position as shown in FIGURES 1, 2 and 3 of the drawings. Linkage means generally designated by the numeral 20, secure the lift augmenting devices 18 to the structure of their respective wings 12. Depending somewhat on the length of the particular lift augmenting device, two or more of the linkages 20 may be employed for each device with one located adjacent the inboard and outboard ends thereof, and an intermediate linkage or linkages if required for additional support on unusually long lift augmenting devices. Since all of the linkage means are identically constructed, only one will be hereinafter described in detail.

Wing 12 is of a usual construction embodying a front, load-carrying spar member 22 extending in a spanwise direction. Lift augmenting devices 18 are connected to the front spar through frames 24 having the base portion 25 thereof fixedly secured to the spar 22. Frame 24 is provided with a pair of spaced bearing retainers 26 projecting forwardly from the base 25 which house ball or roller bearing assemblies 28. Integral with the base portion 25 of the frame 24 are a pair of blade-like extension members 30 spaced from one another in a spanwise direction. These extensions 30 angle downwardly and forwardly from the base portion 25 and are positioned intermediate, and spaced from, the bearing retainers 26. Journalled in the bearings 28 and projecting through openings in the extensions 30 are axially aligned torque shafts 32. The end portions of the torque shafts 32 are provided with splines 34 engaging a mating internal spline in the bore of a lever element 36. Fixed to the wing spar 22 in a position remote from the linkage means 20 is an actuator motor (not shown) having the drive shaft thereof suitably coupled to a torque shaft 32. Since the actuator motor is of a conventional design and does not constitute a part of the present invention, it is believed sufficient to state that it is preferably of a hydraulic type operable in clockwise and counter clockwise directions through an arc of slightly less than 360 degrees. At a position radially spaced from the axis of the torque shafts 32, lever element 36 is pivotally secured, as by a pin, washer and key assembly 38, to one end of a crank member 40. Crank member 40 embodies an arcuate configuration to bridge over shaft 32 whereby when the lift augmenting device is in the retracted position as shown in FIGURE 4, an overcenter locking arrangement is automatically effected as will be more fully described hereinafter. The opposite forward end of crank member 40 to its connection with the lever element 36 lies intermediate a pair of fulcrum arms 42, the lower ends of which are pivotally secured to the frame extensions 30. At a location intermediate the upper and lower ends thereof, each of the fulcrum arms 42 is provided with a clevis 44. A pair of transfer links 46 having one end thereof clevised at 48, align with the fulcrum arms 42. The individual tangs of the clevis 48 are interspersed in sandwich manner with the tangs of the clevis 44 of the fulcrum arms 42. Fulcrum arms 42, transfer links 46, at their respective clevises 44 and 48, and crank member 40 at its forward end, are pivotally joined together on a common axis by a pin, washer and key assembly 50. Opposite the clevised end 48 thereof, transfer links 46 project into a clevis recess 52 of a fulcrum crank 54. Transfer links 46 are pivotally secured to the clevises 52 by pin, washer and nut assemblies 56 extending through bores in the clevises 52 and through suitable bearings in the transfer links 46. One end of fulcrum crank 54 is pivotally secured to, and positioned intermediate, a pair of spaced support arms 58 projecting forwardly from the base 25 of the frame 24. A bolt, washers and nut assembly 60 serves to journal the fulcrum crank 54 onto the support arms 58; the bolt thereof extending through the support arms 58 and through suitable bearings within the fulcrum crank 54. Fulcrum arms 42 opposite their pivotal connection with the frame extensions 30, pivotally secure to a slat 62. Slat 62 is provided with fittings 64 extending from the aft lower surface thereof to provide means for attachment for the fulcrum arms 42. Slightly aft of the leading edge 66 of the slat 62 and projecting from the lower surface thereof is a pair of link attachment fittings 68. A pair of adjustable-length slat links 70 have one end thereof pivotally secured to the fittings 68 and the opposite end pivotally secured to the fulcrum crank 54 at a position intermediate the ends thereof. Slat 62 when in the retracted position as shown best in FIGURES 2 and 4, forms the upper leading edge of the wing 12. The lower leading edge is formed by a flap 72 when in its retracted position. Flap 72 depends from the leading edge of the slat 62 through hinge horns 74 fixed to the flap 72 and pivotally mounted onto the slat 62. Flap links 76 have one end pivotally secured to the flap 72 and the opposite end to the end of the fulcrum crank 54 opposite to its pivotal connection with the support arms 58.

Rerferring now to FIGURES 2 and 3 of the drawings, an up-latch 78 serves to lock its associated lift augmenting device 18 in its retracted position. Up-latch 78 comprises a housing 80 in which a latch bar 82 is reciprocally mounted. Housing 80 secures to frame 24 adjacent one of the support arms 58 by bolts or screws 84. The latch bar 82 is spring-biased into engagement with a hook 86 fixed to the flap 72. A release lever 88 is pivotally secured to the frame 24 at its upper end and pivotally linked to the latch bar 82 at its lower end through a pin 90 carried by the latch bar 82 and projecting through a slotted opening in the release lever 88. Intermediate the upper and lower ends thereof, release lever 88 is provided with a detent portion 92 adapted to receive a pin 94 projecting from a lever element 100 secured to the shaft 32. The axis of pin 94 of lever element 100 is preferably aligned with the axis of the pin, washer and key assembly 38 of the lever element 36 when the lift augmenting device 18 is in retracted position as shown in FIGURES 1, 2, 3 and 4. A seal 96 secured to the flap 72 engages with the structure of the wing when the lift augmenting device 18 is in retracted position to exclude air and moisture flowing around the wing from entering into the cavity of the wing leading edge.

In describing the operation of the present invention, it should first be noted that the lift augmenting devices 18 when in the retracted position as illustrated in FIGURE 4, are locked against accidental extension not only by the up-latch 78, but additionally by a novel overcentering arrangement of the linkage means 20. This overcenter locking is achieved by the position of the pin 94 being slightly below a centerline 98 passing through the axis of the torque shafts 32 and the pin 50.

The extension and retraction of the lift augmenting devices 18 is pilot controlled. In preparing for take-off or landing of the aircraft, the pilot first operates the control to energize the actuator motor. The actuator motor being coupled to the torque shafts 32, causes the torque shafts to rotate in a counterclockwise direction as viewed in FIGURES 3, 4 and 5 of the drawings. Lever element 100 secured to the torque shaft 32 rotates concurrently therewith. Initial movement of the lever element 100 effects withdrawal of the latch bar 82 of the up-latch 78 from its engagement with the flap hook 86 as the pin 94 begins to orbit about the axis of the torque shafts 32. Further rotation of the lever element 100 disposes the pin 94 above the centerline 98, which results in the pivoting of the fulcrum arms 42 about their respective pivotal connections with the frame extensions 30. The upper ends of fulcrum arms 42 being pivotally secured to the slat fittings 64, moves the slat 62 upwardly and forwardly away from its nested position in the wing leading edge structure. Concurrently with this motion, the transfer links 46 through their opposite end pivotal connections with the fulcrum arms 42 and the fulcrum crank 54 respectively, cause the fulcrum crank 54 to pivot about its pivotal connection with the support arms 58. As a result of the parallelogram geometry of the slat links 70, flap links 76, hinge horns 74 and fulcrum crank 54, arcuate movement of the fulcrum crank 54 about its pivotal connection with the support arms 58 urges the slat 62 forwardly of the wing while simultaneously unfolding and extending the flap 72 about the axis of its hinged connection with the slat 62. In its fully extended position as shown in FIGURE 5, the lift augmenting devices 18 provide a combination flap-slat lifting surface to the wing whereby an appreciable increase in lift is afforded during take-off and landing operations.

In retracting the lift augmenting devices, the sequence of operation occurs in a reverse order to that as hereinbefore described for the extension thereof.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

In combination with an airplane having a wing, a lift augmenting device comprising:
a slat;
a flap hinged to said slat;
linkage means connecting said slat and said flap to the leading edge of an aircraft wing;
actuator means connected to said linkage means for moving said slat and flap from retracted to extended and from extended to retracted positions relative to said wing;
said slat being carried by said linkage means to its extended position downwardly relative to said wing in a counterclockwise direction;
said flap being carried by said linkage means to its extended position downwardly relative to said wing in a clockwise direction;
said linkage means embodying an overcenter arrangement of certain of its individual link members whereby said lift augmenting device is maintained in retracted position;
the outer configuration of said slat and flap conforming to the leading edge airfoil contour of said wing when said slat and flap are in retracted position;
said slat and said flap being spaced forwardly of said wing when in extended position;
an up-latch mechanism fixedly secured to said wing;
said up-latch mechanism having a latch bar engaging a hook on said flap to lock said lift augmenting device in its retracted position;
a release lever having one end pivotally secured to said wing and the opposite end pivotally connected to said latch bar;
a lever element extending from said actuator means engaging said release lever; and
said lever element moving said release lever to disengage said latch bar from said flap hook upon initial movement of said actuator means.

References Cited by the Examiner
UNITED STATES PATENTS

| | | | |
|---|---|---|---|
| 1,830,122 | 11/31 | Milburn | 244—42 |
| 1,857,964 | 5/32 | Leonard. | |
| 2,321,837 | 6/43 | Maxwell | 244—42 |
| 2,444,293 | 6/48 | Holt | 244—42 |
| 2,500,512 | 3/50 | Bowers | 244—42 |
| 2,600,527 | 6/52 | Gordon | 244—42 |
| 2,678,784 | 5/54 | Lanier | 244—42 |
| 2,772,058 | 11/56 | Grant | 244—42 |
| 2,836,380 | 5/58 | Pearson | 244—42 |
| 2,852,211 | 9/58 | Xenakis | 244—42 |
| 3,089,666 | 5/63 | Quenzler | 244—42 X |
| 3,128,966 | 4/64 | Alvarez-Calderon | 244—42 |
| 3,129,907 | 4/64 | Dornier et al. | 244—42 |

FERGUS S. MIDDLETON, *Primary Examiner.*

MILTON BUCHLER, *Examiner.*